United States Patent [19]

Kolom

[11] Patent Number: 5,042,751
[45] Date of Patent: Aug. 27, 1991

[54] PRESSURE VESSEL WITH A NON-CIRCULAR AXIAL CROSS-SECTION

[75] Inventor: Aaron L. Kolom, Los Angeles, Calif.
[73] Assignee: TRE Corporation, Santa Ana, Calif.
[21] Appl. No.: 34,642
[22] Filed: Apr. 6, 1987
[51] Int. Cl.$^5$ ............................................. B64D 37/06
[52] U.S. Cl. ............................. 244/135 R; 220/581; 220/660; 428/116
[58] Field of Search ............... 244/117 R, 119, 123, 244/124, 135 R, 133; 220/3, 5 A, 445, 454, 83; 428/116, 117, 119, 73, 156, 157

[56] References Cited

U.S. PATENT DOCUMENTS

| | | | |
|---|---|---|---|
| 2,908,455 | 10/1959 | Hoadley | 428/117 |
| 2,913,074 | 11/1959 | Hartle | 244/135 R |
| 2,925,231 | 2/1960 | Pfaff, Jr. et al. | 428/116 |
| 3,133,422 | 5/1964 | Paivanas et al. | 220/454 |
| 3,232,560 | 2/1966 | Moise et al. | 244/135 R |
| 3,637,446 | 1/1972 | Elliott | 220/3 |
| 3,780,969 | 12/1973 | Nussbaum et al. | 244/123 |
| 3,843,010 | 10/1974 | Morse et al. | 220/3 |
| 4,365,773 | 12/1982 | Wolkovitch | 244/123 |
| 4,662,587 | 5/1987 | Whitener | 244/123 |

OTHER PUBLICATIONS

"Honeycomb Sandwich Design", Hexcel Products Inc., ©1959, pp. 1-10.

Primary Examiner—Galen Barefoot
Attorney, Agent, or Firm—Spensley, Horn, Jubas & Lubitz

[57] ABSTRACT

The present invention provides a pressure vessel having a non-circular axial cross-section, and a method for its construction, which achieves improved reliability, minimum weight, minimum cost, and maximum aerodynamic smoothness. The above characteristics are achieved through the use of honeycomb cores whose thickness varies in accordance with the distribution of bending moments created by the non-circular axial cross-sectional configuration under internal pressure. The present invention also provides a pressure vessel having a non-circular axial cross-section which may be especially designed to meet preestablished design criteria for optimal weight, volume, and strength.

19 Claims, 2 Drawing Sheets

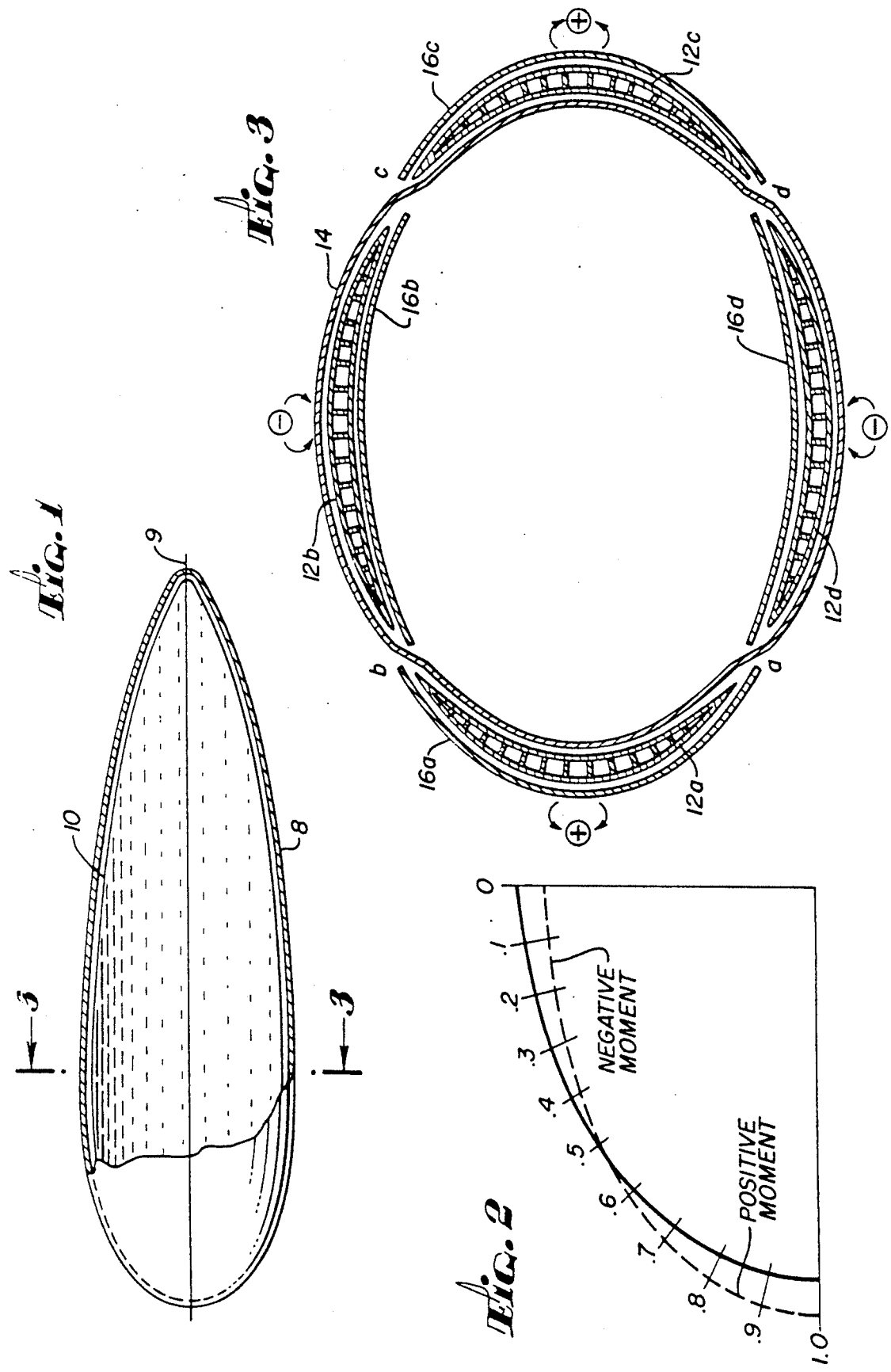

PRESSURE VESSEL WITH A NON-CIRCULAR AXIAL CROSS-SECTION

BACKGROUND OF THE INVENTION

The present invention relates to a type of pressure vessel and more particularly, to a pressure vessel having a non-circular axial cross-section to be used either as an aircraft engine duct or as an aircraft fuel tank. The use of pressure vessels is particularly important with respect to aircraft engine ducts and fuel tanks since an engine duct or fuel tank having an elliptical-shaped axial cross-section is aerodynamically less protrusive than an equivalent circular cross-sectional vessel. Certain problems, however, result from the vessel's non-circular axial cross-sectional configuration. Where the internal pressure forces in a circular pressure vessel create simple "hoop" tension forces in the walls of a "circular" pressure vessel, the walls of a "non-circular" pressure vessel become subject to varying bending moments around the periphery. The bending moments result from the non-circular section tending to become round under the internal pressure, with the bending moments being maximum at the nose and tending to "open up" the nose curvature, reducing to zero, then reversing the bending direction at the top and bottom centerlines.

In the conventional approach to dealing with these bending loads, internal or external frames have been added to the non-circular pressure vessel. These frames are generally added around the entire surface periphery of the pressure vessel, and are closely-spaced along the entire length, thereby greatly increasing the weight and cost of the pressure vessel. An additional disadvantage of using these frames is the deflection of the shell's skin between each of the frame members in the presence of pressure This skin deflection increases aerodynamic drag, and thereby reduces propulsion efficiency, thus again necessitating close spacing of the frames leading to increased weight and cost.

An object of the present invention is to provide a non-circular pressure vessel that avoids the use of support frames and their corresponding disadvantages. An additional objective of the present invention is to provide a non-circular pressure vessel with essentially constant compression and tension loads around the periphery despite the varying bending moments created by the non-circular cross-sectional axial configuration. A further objective is to provide a non-circular pressure vessel that is able to carry fuselage axial compression and bending loads resulting from its attachment to the fuselage. A further objective of the present invention is to provide a non-circular pressure vessel that has minimal weight and maximum aerodynamic smoothness, and which may be constructed with minimal cost and with improved reliability.

SUMMARY OF THE INVENTION

The present invention achieves the above objectives and others, by using a sandwich structure, which includes honeycomb cores in the illustrated embodiment, for constructing a non-circular pressure vessel. The honeycomb cores are configured to particularly adapt to the varying distribution of bending moments created by the non-circular cross-sectional configuration, and thus limit the loads and stresses of the sandwich skins.

In this manner, the present invention achieves its objectives of improved structural reliability, minimum weight, and minimum cost. In addition, the use of the honeycomb structure avoids the use of frames, thereby further minimizing the weight and cost of the non-circular pressure vessel Furthermore, since the honeycomb structure provides a stiff structure along the length of the pressure vessel, there are no resulting areas of skin deflection that would be ordinarily created by the use of frames. Consequently, the present invention achieves its objective of maximum aerodynamic smoothness. The honeycomb sandwich also provides the additional advantage of stiffness and strength to accomodate fuselage axial compression and bending loads resulting from the vessel shell's attachment to the fuselage.

DESCRIPTION OF THE DRAWINGS

A detailed description will be made with reference to the accompanying drawings wherein:

FIG. 1 is a transverse view partially in section of the present invention as an aircraft fuel tank;

FIG. 2 represents a bending moment curve along one quadrant of the pressure vessel shell taken along its cross-sectional axial view;

FIG. 3 is a cross-sectional axial view taken along lines 3—3 of FIG. 1;

DESCRIPTION OF THE PREFERRED EMBODIMENT

Figure 4:
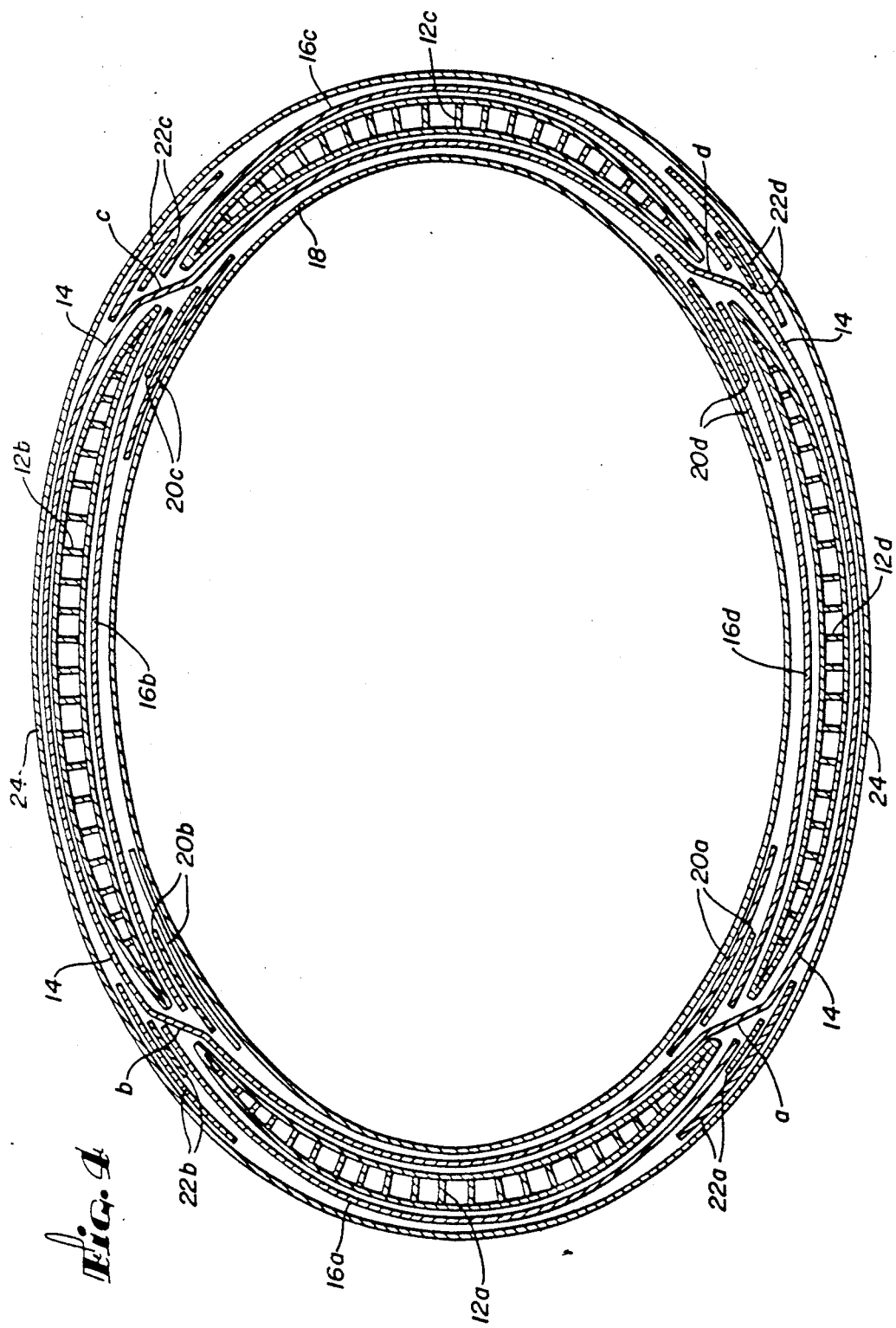
FIG. 4 is a cross-sectional axial view of another embodiment of the pressure vessel shell of the present invention.

The following description is of a presently contemplated mode of carrying out the present invention. This description is not to be taken in a limiting sense; it is made merely for the purpose of illustrating the general principles of the invention since the scope of the invention is best defined by the appended claims.

In its preferred embodiment, the present invention may be utilized as an engine duct or an aircraft fuel tank. In FIG. 1, the present invention is shown being used as a fuel tank 8 having a longitudinal axis 9 and an elliptical axial cross-section. A thin plastic liner 10 may be carried within the shell of the fuel tank for fuel-containment purposes.

In FIG. 2, the solid line represents one quadrant of a cross-section of the "elliptical" tank shown in FIG. 1. The dashed line represents a moment curve along the same quadrant in which the size of the bending moment is represented by the distance between the two lines. As can be seen, outward pressure from the contained fuel results in a varying distribution of bending moments along the tank shell's periphery. In one study conducted by the applicant, the following magnitudes of bending moments were obtained at each of ten equally divided points along the quadrant:

TABLE A

| X/S | Moment (lb. in.) |
| --- | --- |
| 0 | −4188 |
| .1 | −4080 |
| .2 | −3564 |
| .3 | −2760 |
| .4 | −1704 |
| .5 | −492 |
| .6 | 972 |
| .7 | 2472 |
| .8 | 3840 |
| .9 | 4776 |
| 1.0 | 5760 |

As can be seen from Table A, the bending moments vary from a high negative value at point 0 to a high positive value at point 1.0, with an inflection point occurring somewhere between points 0.5 and 0.6. At that inflection point, the bending moment equals zero.

Depending upon whether the bending moments are positive or negative, the inner and outer layers of the tank's shell may be subjected to either tension or compressive forces. For example, as can be seen in FIG. 3, the pressure shell is subjected to positive bending movements from point a to point b. Consequently, the outer layer is subjected to compressive forces and the inner layer is subjected to tension forces. However, from points b to c, the pressure shell is subjected to negative bending movements. As a result, the outer layer becomes subjected to tension forces and the inner layer becomes subjected to compressive forces.

The present invention provides for the use of honeycomb core elements 12 as shown in FIG. 3 as a means of carrying the varying bending moments and to distribute the resulting tension and compression loads To accomplish these two goals in accordance with the present invention's objectives of maximum structural integrity while minimizing weight and cost, the present invention varies the thickness of honeycomb cores 12 in accordance with the size of the bending moments. The actual thickness of the honeycomb core varies depending upon several factors. Major factors, of course, are the size and shape of the pressure vessel and the internal pressure. Additional factors are the types and strengths of the skin plies and the honeycomb core used, the desired volume and weight of the tank, and the amount of deflection permitted.

The "elliptical" tank, subjected to the moments shown in Table A, was placed under the following conditions: (a) internal pressure=120 psi, (b) major axis=34 inches, (c) minor axis=23 inches, and (d) honeycomb core=3 p.c.f. Under those conditions, the appropriate variations in honeycomb core thickness that results in desired tension and compression load levels varied from 0 to approximately one inch along the periphery, as shown in the following Table B:

TABLE B

| X/S | Core Ht. (in.) |
| --- | --- |
| 0 | .872 |
| .1 | .85 |
| .2 | .74 |
| .3 | .58 |
| .4 | .36 |
| .5 | .10 |
| .7 | .52 |
| .8 | .8 |
| .9 | 1.0 |
| 1.0 | 1.075 |

The above described configuration is not to be taken as limiting. Under other conditions, the appropriate honeycomb core thickness will be different.

In addition to achieving an optimal configuration for a non-circular pressure tank, the present invention also provides for a non-circular pressure vessel that may meet preestablished design criteria. The present invention accomplishes this flexibility by teaching the use of load-bearing skins which assist in carrying and distributing the loads resulting from the bending moments. Since both tension and compressive loads are involved, two types of load-bearing skins are preferably used, one tension and one compression.

The tension-bearing skin 14 is preferably made of filamentary composite material. However, other similar types of material capable of carrying tension loads may be used. In addition, the thickness of the tension-bearing skin may vary, depending upon the strength of the material. In order to minimize weight and maximize volume, it is preferable to maintain the thickness of the tension skin at approximately 0.030 to 0.040 inches. As shown in FIG. 4, the tension skin 14 can be filament-wound around the entire periphery.

The compression skin 16, on the other hand, is preferably laid up of broadgoods composite material, although again, other similar material capable of carrying compression loads may be used. In addition, the thickness of the compression skin may vary depending upon the critical compression stress desired, although preferably its thickness is approximately 0.020 to 0.030 inches.

Since the type of load varies from one section of the tank shell to another, the particular placement of the type of load-bearing skin is important. For example, where the tension loads are at the outer layer of the tank's periphery, tension skin 14 should accordingly be placed near the outer periphery. On the other hand, where the tension loads are located near the inner layer of the tank's periphery, tension skin 14 should be placed near the inner layer. Likewise, compression skin 16 should similarly be placed in accordance with the location of the compressive forces As a result of the necessity to interweave the compressive and tension skins back and forth between the inner and outer layers of the vessel shell, the two skins will intersect. Consequently, at least one of the skins is precluded from being continuous. Although both skins may be constructed so that neither is continuous, it is preferable to have tension skin 14 be continuous. The primary reason for this is that the tension loads in a non-circular pressure vessel are typically much larger than the compression loads. By making tension skin 14 continuous, the tension loads are thereby more evenly distributed. In addition, the reliability of the pressure vessel is increased since tension skin 14 has greater reliability as the result of its being continuously wound.

In accordance with the preferred embodiment, as shown in FIG. 3, continuous tension skin 14 is located to the outside of honeycomb layers 12b, 12d, where the tension forces are concentrated at the outer layers, and is located to the inside of honeycomb cores 12a, 12c, where the tension forces are concentrated at the inner layers. On the other hand, compression skin 16 is divided into four segments; segments 16b, 16d are placed to the inside of honeycomb cores 12b, 12d, and segments 16a, 16c are placed to the outside honeycomb cores 12a, 12c.

Both an inner and outer wrap may be employed to further assist in the carrying and distribution of the tension and compression loads, and to also provide additional strength to the tank so as to withstand, for example, a drop or ejection Thus, as seen in FIG. 4, inner wrap 18 may be positioned as the first inner layer of the pressure vessel shell. (Tank liner 10 has been omitted for purposes of clarity). Inner wrap 18 is preferably continuous around the entire periphery of the shell. Inner wrap 18, like tension skin 14, is preferably constructed of composite material. In addition, inner wrap 18 may have a thickness selected according to the loads to be encountered, and is typically about 0.020 inches.

Similarly, outer wrap 22 is preferably continuous around the entire periphery of the pressure vessel shell, and would represent its outermost surface. Not only does outer wrap 22 serve a load bearing purpose, but it also permits the outer surface of the tank to be smooth for aesthetic and aerodynamic purposes. Since structural integrity under fire or ballistic conditions may also be desired, outer wrap 22 is preferably constructed of a hybrid glass and graphite material. However, any material having a load bearing capability and a smooth finish may be used. The thickness of outer wrap 22 is selected according to the loads to be encountered and is typically about 0.020 inches.

To assist in distributing the discontinuous loads at the inflection point, doublers may be employed. A doubler is simply an additional layer of load-bearing skin. This, as further seen in FIG. 4, inner doublers 20a, 20b, 20c, 20d; and outer doublers 22a, 22b, 22c, and 22d may be placed under and over the inflection point. Both inner and outer doublers are preferably made of broadgoods composite material, but like compression skin 16, they may be made of any other similar material. The thickness of both inner and outer doublers may be selected according to the particular application and typically have a thickness of approximately 0.030 to 0.040 inches.

The method of constructing the non-circular pressure vessel will now be explained with reference to the embodiment described in FIG. 4. Inner wrap 18 is formed by filament winding of epoxy resin material around the entire periphery of a tank liner (not shown). Although filament winding is the preferred method, inner wrap 18 may also be prefabricated and then simply laid up around tank liner 10. Inner doublers 20a, 20b, 20c, and 20d may then be laid up on top of inner wrap 18 over the various points of inflection. Compression skins 16b, 16d, are then laid up along the periphery of the tank where the compression loads are concentrated at the inner surface. Honeycomb cores 12b, 12d, are then laid up over compression skins 16b, 16d. Tension skin 14 is then filament wound around the entire periphery of the yet uncompleted tank shell. Although filament winding is preferred to ensure the tension skin's continuity, tension skin 14 may also be prefabricated and laid up. Honeycomb cores 12a, 12c, are then laid up along the periphery of the tank shell not yet supported by honeycomb cores. Compression skins 16a, 16c are then laid up over honeycomb cores 12a, 12c, between inflection points a, b and c, d. Outer doublers 22a, 22b, 22c, and 22d are then laid up over each of the inflection points. Finally, outer wrap 24 is filament wound around the entire periphery to complete the tank shell. Although outer wrap 24 is preferably filament wound, it may also be prefabricated and laid over the entire periphery.

It should be noted that the above description of the method of construction was directed to the fabrication of the most complete embodiment of the non-circular pressure vessel of the present invention. Other embodiments may be fabricated which do not contain certain elements, i.e., inner doublers 20a–20d In that case, that particular step which includes laying up doublers 20a–20d may be simply omitted.

What is claimed is:

1. A pressure vessel having a non-circular axial cross-section and being subjected to varying bending moments along its periphery, said pressure vessel comprising a sandwich shell with a core layer that varies in thickness in accordance with said bending moments, said sandwich shell including inner and outer layers, at least one of which is a load-bearing layer.

2. A pressure vessel as claimed in claim 1 wherein said sandwich shell further comprises doublers placed along points where bending moments of said shell change direction.

3. A pressure vessel having a non-circular axial cross-section and being subjected to varying bending moments along its periphery, said pressure vessel comprising a sandwich shell with a core layer that varies in thickness in accordance with said bending moments and wherein the sandwich shell comprises a honeycomb core.

4. A pressure vessel as claimed in claim 3 wherein said honeycomb core varies in thickness so that compression and tension loads in said shell created by said bending moments are substantially constant along said shell.

5. A pressure vessel as claimed in claim 4 wherein said shell further comprises one or more load-bearing skins.

6. A pressure vessel as claimed in claim 5 wherein at least one of said load-bearing skins is continuous around the periphery of the shell.

7. A pressure vessel as claimed in claim 6 wherein said continuous load-bearing skin is a tension-bearing skin.

8. A pressure vessel as claimed in claim 3 wherein the thickness of said honeycomb core varies from 0 to approximately 1 inch.

9. A pressure vessel for containing fluid or air, said vessel having a substantially elliptical axial cross-section and being subjected to varying bending moments along its periphery, said vessel distributing loads created by the varying bending moments, comprising:
    a honeycomb core whose thickness varies in accordance with the size of said bending moments, and
    at least one layer of load-bearing skin adjacent the honeycomb core, the core and skin forming a sandwich shell having a longitudinal axis and a substantially elliptical axial cross-section.

10. A pressure vessel as claimed in claim 9 wherein said sandwich shell provides stiffness and strength in a direction along said longitudinal axis, so as to contribute strength and stiffness to a fuselage structure of which it is attached.

11. A method for constructing a pressure vessel shell having a non-circular axial cross-section, comprising a sandwich shell made up of one or more layers, said shell including inflection points where bending moments change in direction, said bending moments causing compression and tension loads on said shell layers, comprising steps of:
    forming a first shell layer with a first compression skin located along areas of said shell where said compression loads would be concentrated;
    forming a second shell layer by placing a first honeycomb core over said first compression skin, the thickness of said honeycomb core varying in accordance with the size of bending moments along said first honeycomb core;
    forming a third shell layer with a tension skin placed along areas of said shell where said tension loads would be concentrated;
    forming a fourth shell layer by placing a second honeycomb core over said tension skin, the thickness of said second honeycomb core varying in accordance with the size of bending moments along said second honeycomb core; and forming a fifth shell layer by placing a second compression skin over said second honeycomb core.

12. A method as claimed in claim 11 wherein said tension skin is continuously wound by filament winding.

13. A method as claimed in claim 11 further comprising the step of forming an inner wrap as an innermost shell layer for carrying tension and compression loads prior to said step of forming said first shell layer.

14. A method as claimed in claim 11 further comprising the step of forming an outer wrap as an outermost shell layer for carrying tension and compression loads after said step of forming said fifth shell layer.

15. A method as claimed in claim 13 wherein said inner wrap is continuously wound by filament winding.

16. A method as claimed in claim 14 wherein said outer wrap is continuously wound by filament winding.

17. A method as claimed in claim 11 further comprising the step of laying up doublers over said inflection points.

18. A pressure vessel having a non-circular axial cross-section and being subjected to varying bending moments along its periphery and having inflection points where the bending moments change in direction, thereby causing changes between compression and tension loads acting on the inner and outer surfaces of the wall of said pressure vessel, wherein the pressure vessel comprises a sandwich shell made up of at least three layers, said layers comprising:

a core layer of honeycomb material whose thickness varies in correspondence with the varying bending moments along the pressure vessel periphery so as to uniformly distribute the tension and compression loads resulting from the bending moments;

a load-bearing inner skin of substantially constant thickness that is subjected to substantially constant tension load along certain portions of the periphery and of substantially constant thickness that is subjected to substantially constant compression load along the remaining portions of the periphery; and a load-bearing outer skin of substantially constant thickness that is subjected to substantially constant compression load along certain portions of the periphery and of substantially constant thickness that is subjected to substantially constant tension load along the remaining portions of the periphery.

19. A pressure vessel as claimed in claim 18 wherein the thickness of the load-bearing skin subjected to tension load is different from the thickness of the load-bearing skin subjected to compression load.

* * * * *